United States Patent
Bond et al.

(10) Patent No.: US 9,810,153 B2
(45) Date of Patent: Nov. 7, 2017

(54) ENGINE

(71) Applicant: Reaction Engines Ltd, Abingdon (GB)

(72) Inventors: Alan Bond, Abingdon (GB); Richard Varvill, Abingdon (GB)

(73) Assignee: Reaction Engines Ltd, Abingdon (GB)

(*) Notice: Subject to any disclaimer, the term of this patent is extended or adjusted under 35 U.S.C. 154(b) by 455 days.

(21) Appl. No.: 14/296,624

(22) Filed: Jun. 5, 2014

(65) Prior Publication Data

US 2015/0101342 A1    Apr. 16, 2015

(30) Foreign Application Priority Data

Oct. 11, 2013    (GB) .................................. 1318111.0

(51) Int. Cl.
| | |
|---|---|
| F02C 3/04 | (2006.01) |
| F02C 7/228 | (2006.01) |
| F02C 7/04 | (2006.01) |
| F02C 7/143 | (2006.01) |
| F02K 7/18 | (2006.01) |

(Continued)

(52) U.S. Cl.
CPC .............. *F02C 7/228* (2013.01); *F02C 3/04* (2013.01); *F02C 7/04* (2013.01); *F02C 7/08* (2013.01); *F02C 7/143* (2013.01); *F02K 7/18* (2013.01); *F02K 9/78* (2013.01); *F05D 2220/70* (2013.01); *F05D 2240/35* (2013.01); *F05D 2260/20* (2013.01); *F05D 2260/213* (2013.01)

(58) Field of Classification Search
CPC .... F02C 3/04; F02C 7/228; F02C 7/04; F02C 7/08; F02C 7/143; F02C 7/18; F02K 7/18; F02K 9/78

USPC .......................................................... 60/776
See application file for complete search history.

(56) References Cited

U.S. PATENT DOCUMENTS

| | | | |
|---|---|---|---|
| 1,888,749 A | 11/1932 | Urquhart | |
| 2,673,445 A * | 3/1954 | Bruckmann | F02K 9/52 60/225 |
| 2,676,457 A | 4/1954 | Kramer | |

(Continued)

FOREIGN PATENT DOCUMENTS

| | | |
|---|---|---|
| CN | 101059097 A | 10/2007 |
| CN | 203214192 U | 9/2013 |

(Continued)

OTHER PUBLICATIONS

UK Intellectual Property Office Search Report for Ser. No. GB13118111.0 dated May 14, 2014.

(Continued)

*Primary Examiner* — Peter Helvey
(74) *Attorney, Agent, or Firm* — Covington & Burling LLP; Andrea G. Reister; Melody Wu

(57) ABSTRACT

The present disclosure relates to an engine having two modes of operation—air breathing and rocket—that may be used in aerospace applications such as in an aircraft, flying machine, or aerospace vehicle. The engine's efficiency can be maximized by using a precooler arrangement to cool intake air in air breathing mode using cold fuel delivery systems used for the rocket mode. By introducing the precooler and certain other engine cycle components, and arranging and operating them as described, problems such as those associated with higher fuel and weight requirements and frost formation can be alleviated.

47 Claims, 6 Drawing Sheets

(51) Int. Cl.
*F02K 9/78* (2006.01)
*F02C 7/08* (2006.01)

(56) References Cited

U.S. PATENT DOCUMENTS

| | | | | |
|---|---|---|---|---|
| 2,713,243 A | | 7/1955 | Seaver | |
| 2,960,824 A | * | 11/1960 | Plummer | F02C 7/272 60/225 |
| 3,030,771 A | * | 4/1962 | Hopper | F02C 3/06 239/265.33 |
| 3,049,876 A | * | 8/1962 | Connors | F02K 9/62 244/74 |
| 3,138,921 A | * | 6/1964 | Prince, Jr. | F02K 1/08 239/456 |
| 3,192,712 A | * | 7/1965 | Nash | F02K 1/08 239/455 |
| 3,387,457 A | | 6/1968 | Garraway | |
| 3,733,824 A | * | 5/1973 | Grainger | F02K 1/54 60/224 |
| 3,802,190 A | * | 4/1974 | Kaufmann | B64C 9/38 239/265.15 |
| 4,007,892 A | * | 2/1977 | Tabor | B64D 27/00 244/2 |
| 4,170,109 A | * | 10/1979 | Egan, Jr. | F23R 3/18 60/204 |
| 4,170,111 A | * | 10/1979 | Lewis | F23R 3/20 60/262 |
| 4,461,145 A | * | 7/1984 | Stephens | F02K 3/075 60/226.3 |
| 4,896,501 A | * | 1/1990 | Faulkner | F02K 3/11 60/264 |
| 5,052,176 A | * | 10/1991 | Labatut | F02K 3/10 60/225 |
| 5,115,637 A | * | 5/1992 | Shekleton | F02C 7/26 60/39.823 |
| 5,131,223 A | * | 7/1992 | Owen | F02C 7/26 60/263 |
| 5,159,809 A | * | 11/1992 | Ciais | F02C 7/16 60/225 |
| 5,351,480 A | * | 10/1994 | Kretschmer | F02K 1/09 239/265.11 |
| 5,419,117 A | * | 5/1995 | Greene | F02C 7/042 60/224 |
| 6,119,985 A | * | 9/2000 | Clapp | B64C 39/02 244/135 R |
| 6,367,243 B1 | * | 4/2002 | Schmidt | B64G 1/002 376/318 |
| 6,430,919 B1 | * | 8/2002 | Duncan | F02K 7/00 60/247 |
| 6,457,306 B1 | * | 10/2002 | Abel | B64G 1/401 417/16 |
| 6,644,015 B2 | * | 11/2003 | McKinney | F02K 9/78 60/205 |
| 7,721,524 B2 | * | 5/2010 | Jahnsen | F02K 3/06 60/224 |
| 7,770,377 B2 | * | 8/2010 | Rolt | F02K 3/06 60/226.1 |
| 7,849,670 B2 | * | 12/2010 | Beckel | B64C 30/00 60/225 |
| 8,256,203 B1 | * | 9/2012 | Blackmon | F02K 1/004 60/224 |
| 8,281,567 B2 | * | 10/2012 | Kohn | F02K 7/18 60/204 |
| 8,701,379 B2 | * | 4/2014 | Bulman | F02K 7/14 244/53 R |
| 8,844,266 B1 | * | 9/2014 | Paulino | F01D 5/025 60/226.3 |
| 9,169,806 B2 | * | 10/2015 | Guyader | F02C 7/27 |

FOREIGN PATENT DOCUMENTS

| | | |
|---|---|---|
| EP | 1905997 A1 | 4/2008 |
| GB | 2238080 A | 5/1991 |
| WO | WO-00/57048 A2 | 9/2000 |

OTHER PUBLICATIONS

PCT International Search Report (PCT Article 18 and Rules 43 and 44) for PCT/GB2014/000408, dated Feb. 13, 2015.

PCT Written Opinion of the International Searching Authority (PCT Rule 43bis.1) for PCT/GB2014/000408, dated Feb. 13, 2015.

* cited by examiner

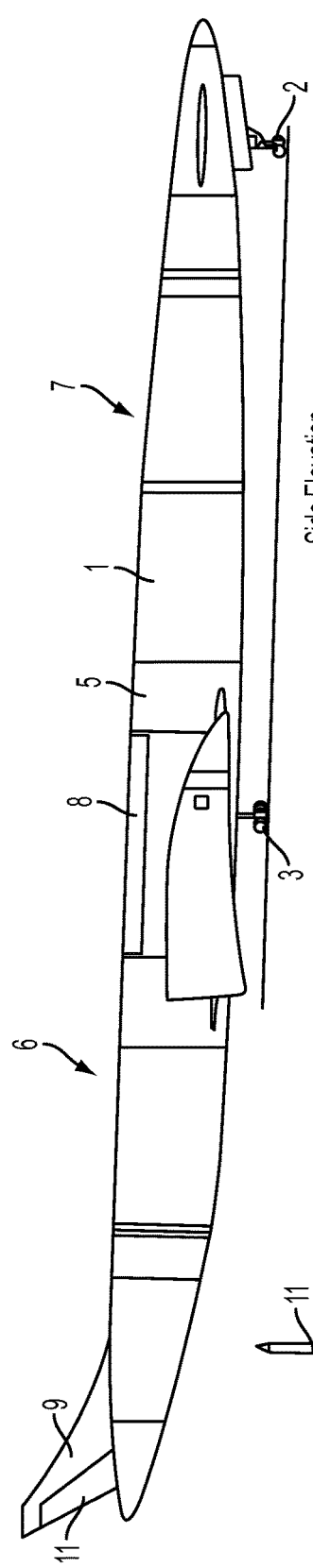
FIG. 1A Side Elevation
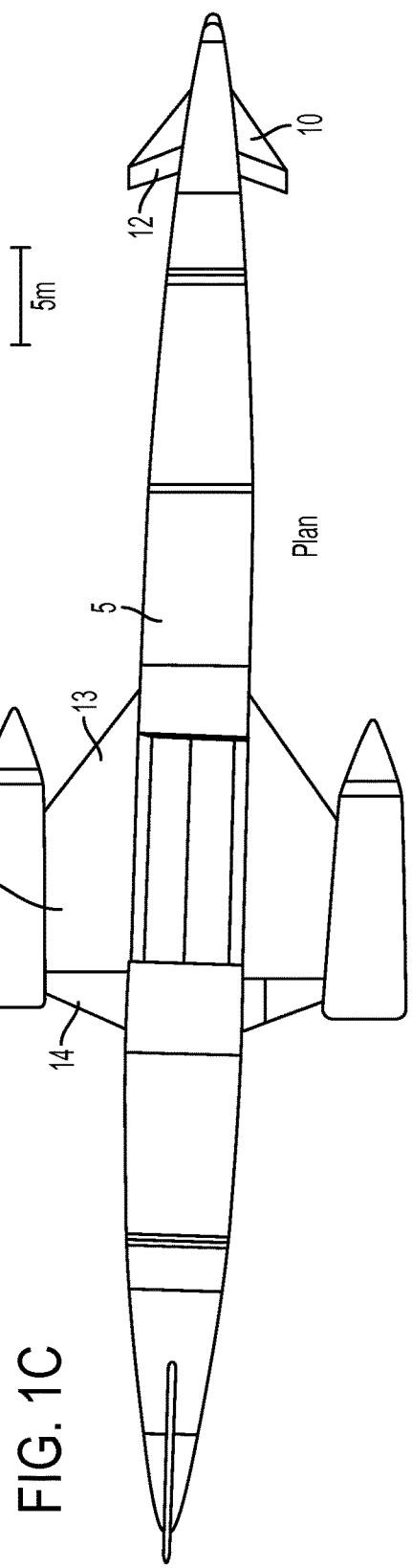
FIG. 1B Plan
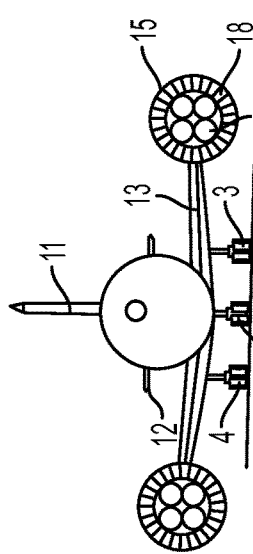
FIG. 1C Rear Elevation

ENGINE

CROSS-REFERENCE TO RELATED APPLICATIONS

The present application claims priority under 35 U.S.C. §119(a) to the following application filed in the United Kingdom on Oct. 11, 2013, which is incorporated herein by reference: GB 1318111.0.

FIELD

The present disclosure relates to an engine such as of the type which may be used in aerospace applications. The disclosure also relates to a method of operating such an engine as well as an aircraft, flying machine or aerospace vehicle including such an engine.

BACKGROUND

Attempts have been made to produce a single stage to orbit (SSTO) vehicle. In order to be commercially viable, such a vehicle would generally require a high payload fraction in order that it may be adapted to meet different operational requirements. In addition, such a vehicle would be readily ground maneuverable and have a short maintenance turnaround cycle.

It is theoretically possible to realize an SSTO with high performance rocket propulsion. However, to use a rocket from take-off would necessitate a high payload of an oxidant, e.g. liquid oxygen, which would add considerable mass to the vehicle. One option is to augment the rocket engine with an alternative power propulsion unit and then to complete the ascent into orbit on rocket propulsion alone.

GB-A-2240815 describes a dual-mode or hybrid aerospace propulsion engine. In this engine, in a first mode of operation, the engine employs liquid hydrogen fuel to pre-cool the intake air of a turbo-compressor in order to deliver it, at high pressure, as oxidizer, to a rocket type combustor/nozzle assembly. At high Mach numbers, e.g. in excess of Mach 5, the engine changes to a second mode of operation which operates as a conventional high performance rocket engine using liquid oxygen carried on the vehicle to oxidize the liquid hydrogen fuel.

Such a hybrid engine can serve to extend the performance of the rocket engine by adding air breathing capability to it. Rocket engines are considered to be the most appropriate engine for achieving the necessary velocity to achieve orbit, for example, with an effective vacuum exhaust velocity ($V_{ef}$) of about 4500 m/s.

In order that a common combustion and nozzle system can be employed in both propulsion modes (i.e. rocket and air-breathing modes), inlet air must typically be compressed to high pressure similar to, but not necessarily identical with, that in rocket operation (approximately 150 bar). In order to do this, the inlet air is first cooled, to keep the delivery temperature within practical limits (below 800K) and to minimize the compressor work required of the turbo-compressor.

However, such an engine can have large fuel demands. The present disclosure seeks to alleviate, at least to a certain degree, the problems and/or address at least to a certain extent, the difficulties associated with the prior art.

SUMMARY

According to a first aspect of the disclosure, there is provided an engine comprising:

a rocket combustion chamber for the combustion of fuel and oxidant;

an air-breathing combustion chamber for the combustion of fuel and oxidant;

a compressor for pressurizing air for supply to said air-breathing combustion chamber;

a first fuel delivery system for delivering fuel to said first rocket combustion chamber;

a second fuel delivery system for delivering fuel to said air breathing combustion chamber;

an oxidant delivery system for delivering oxidant to said rocket combustion chamber;

wherein the air breathing combustion chamber and the rocket combustion chamber are configured to be operated independently.

Such an engine may therefore operate using compressed air as an oxidant and a fuel for combustion in the air-breathing combustion chambers. When incorporated in an aircraft, this allows take-off using air. This can reduce the fuel requirements compared with an engine with only a rocket combustion chamber.

The air-breathing combustion chamber and rocket combustion chamber may operate independently, i.e. each type of combustion chamber may combust oxidant and fuel, without reliance on the other.

The engine may be configured as a propulsion engine, for example for aircraft or aerospace applications.

The engine may operate using air up to a predetermined velocity, for example around Mach 5, when the oxidant requirements of the air-breathing engine can be satisfied by the compressor. Above a predetermined velocity, for example above Mach 5, the engine can switch from the air-breathing mode to a full rocket mode, where an on-board oxidant is used. During transition, from air-breathing to full rocket mode, the engine may be configured such that both modes are operational, for example as the air-breathing mode is powered down and the rocket mode is powered up.

The first and second fuel delivery systems may comprise one or more pumps. The first and second fuel delivery systems may be combined, with switches or valves to direct fuel to a predetermined combustion chamber. The fuel may be provided in an on-board store and may be provided in cryogenic form.

Optionally, the engine further comprises:

a first heat exchanger arrangement having an inlet and an outlet arranged for cooling air to be supplied to said compressor using a heat transfer medium before compression by said compressor;

a heat transfer medium loop for said heat transfer medium;

a second heat exchanger arrangement configured for cooling of said heat transfer medium by fuel delivered by said fuel delivery system.

The first heat exchanger arrangement may be configured as a heat exchanger comprising a plurality of heat exchanger stages. This can allow the degree of cooling to be controlled over the heat exchanger to assist with frost control. The engine may be provided with an air intake with a deceleration device to reduce the air velocity, for example, when the engine is incorporated into an aircraft.

The heat transfer medium or fluid may usefully also serve as a working fluid, i.e. it is capable of being expanded and compressed. This fluid may be used in a power loop of the engine, e.g. to drive turbines.

The second heat exchanger arrangement may be configured as one of more heat exchangers. The second heat exchanger arrangement may be formed as one or more counter flow heat exchangers. The fuel may therefore be usefully exploited as a cooling medium to cool the heat transfer medium, before the fuel is passed to the combustion chambers.

The first heat exchanger may be configured as a counter flow heat exchanger.

Optionally, the engine further comprises a turbine for driving said compressor, the turbine being configured to be driven using a portion of heat transfer medium from the outlet of the first heat exchanger arrangement.

Although reference has been made in this specification to turbines and compressors, any suitable machinery may be employed which may be driven by the working fluids or which may compress the working fluid. As such, references to turbines should be understood to include any machine which may be driven by a fluid, e.g. a gas and references to compressors should be understood to mean any machine which can compress a fluid.

Optionally, the engine further comprises a third heat exchanger arrangement configured for heating said heat transfer medium before delivery to said turbine.

Optionally, the engine comprises a first pre-burner configured to partially combust at least a portion of the fuel before delivery to said air breathing combustion chamber. The first pre-burner may be supplied with fuel from the second fuel delivery system.

Optionally, an exhaust from said pre-burner is connected to said third heat exchanger arrangement for heating of said heat transfer medium. The pre-burner can therefore be used to increase the enthalpy of the heat transfer medium. The heat transfer medium can therefore be usefully employed as a working fluid to drive devices such as turbomachinery in the engine.

Optionally, the first pre-burner is configured to partially combust air from said compressor with fuel from said second fuel delivery system. The combustion products of the pre-burner may then be delivered to the air-breathing combustion chamber. Additional fuel may be provided to the air-breathing combustion chamber by the second fuel delivery system. Energy from the fuel can therefore be used to drive the engine cycle.

Optionally, the second heat exchanger arrangement comprises one or more regenerator stages.

The heat transfer medium may comprise a high pressure gas, which is preferably above the condensation temperature at all locations in the cycle.

The regenerator stages may be used to reduce the temperature/enthalpy of the heat transfer medium before delivery to the first heat exchanger arrangement.

Optionally, the regenerator stages comprise a series of successive heat exchangers and pumps. The regenerator stages may be configured to transfer heat from the heat transfer medium to the fuel from the second fuel delivery system.

Optionally, the engine comprises one or more bypass valves in the heat transfer medium loop for bypassing the heat transfer medium around one or more stages of the first heat exchanger arrangement.

The bypass valves allow the cooling of the air to be optimized to achieve a desired temperature before the compressor.

Optionally, a second pre-burner is provided for partially combusting fuel before delivery to the rocket combustion engine with oxidant supplied by the oxidant delivery system.

Optionally, an exhaust of the second pre-burner is used to drive one or more turbines for driving the first fuel delivery system and/or the oxidant delivery system.

Optionally, the engine further comprises one or more bypass burners for burning a portion of fuel delivered from the second fuel delivery system. The engine may be supplied with an excess of fuel and the bypass burners may be operated in air-breathing mode.

Optionally, a plurality of said air-breathing combustion chambers are provided and arranged around said rocket combustion chamber.

Optionally, the rocket combustion chamber and the air-breathing combustion chamber share a common nozzle.

This can reduce the component requirements, by directing the exhaust from both types of combustion chamber to a single nozzle. The use of a common, single nozzle for both the rocket combustion chamber and air-breathing combustion chamber can serve to reduce the base drag on a vehicle comprising such an engine by eliminating the need for a separate nozzle for each of the rocket and air-breathing combustion chambers. This is because nozzles can have high area ratios, which can cause a high degree of drag.

The engine may be provided with plurality of rocket chambers and air-breathing combustion chambers.

Optionally, fuel from the second fuel delivery system is used to drive one or more turbines coupled to pumps for driving the heat transfer medium around the heat transfer medium loop. The temperature/enthalpy of the fuel from the second fuel delivery system may be increased as a result of heat transfer from the heat transfer medium. This increase in temperature/enthalpy enables the fuel to be used to drive the turbines to drive the pumps or recirculators of the heat transfer medium loop.

Optionally, the heat transfer medium is arranged or configured in or as a closed flow loop. The heat transfer fluid may be contained in a closed flow loop. Means may be provided to top up the heat transfer medium in the loop or vent the heat transfer medium as required.

Optionally, the engine comprises helium as the heat transfer medium or working fluid. Neon or any other suitable heat transfer medium or working fluid may be used. Monatomic gases are preferred and can advantageously minimize the total cycle pressure ratio. This allows the duct sizes in the engine to be reduced over the use of larger molecular gases although the number of stages required in turbomachinery for the working fluid may be relatively high. Larger molecular gases can allow for more simple turbomachinery, e.g. turbines, compressors etc. with fewer stages, but the duct size and their mass can then increase.

Preferably, the heat transfer medium is gaseous during the work and cooling cycle.

Using a gaseous medium as the heat transfer medium or ensuring the heat transfer medium remains gaseous in the heat exchangers serves to reduce any entropy rise in the heat exchangers. This is because, with gaseous streams, the temperature difference between streams in a heat exchanger can remain substantially constant. A gaseous heat transfer medium or working fluid can allow for a more simple regenerator arrangement with a reduced number of stages compared with an engine in which the working fluid may liquefy.

Optionally, wherein the first and second fuel delivery systems are configured to supply hydrogen as said fuel.

Optionally, the air-breathing combustion engine is configured to combust compressed air from said compressor with fuel.

Optionally, the engine is configured for the partial combustion of fuel with said compressed air before delivery to said air-breathing combustion chamber.

The air-breathing combustion chamber may be configured to operate at a lower pressure than the rocket combustion chamber.

Optionally, the engine is adapted for ignition into an air breathing mode in which it is adapted to produce thrust in continuous operation at zero air speed.

According to a second aspect of the disclosure there is provided a method of operating an engine, the engine comprising:
- a rocket combustion chamber for the combustion of fuel and oxidant;
- an air breathing combustion chamber for the combustion of fuel and oxidant;
- a compressor for pressurizing air for supply to said air-breathing combustion chamber;
- a first fuel delivery system for delivering fuel to said first rocket combustion chamber;
- a second fuel delivery system for delivering fuel to said air breathing combustion chamber;
- an oxidant delivery system for delivering oxidant to said rocket combustion chamber;
- wherein the air-breathing combustion chamber and the rocket combustion chamber are configured to be operated independently;
- wherein the air-breathing combustion chamber is supplied with fuel and oxidant in a first mode of operation; and wherein in a second mode of operation, the rocket combustion chamber is supplied with fuel and oxidant.

The independent operation of the air-breathing combustion chamber and the rocket combustion chamber allows the engine to operate in the two modes of operation and each type of combustion chamber may be optimized for operation with the supplied oxidant and fuel. The engine may be operated as a propulsion engine to provide thrust from the rocket combustion chamber and/or air-breathing combustion chamber.

Optionally, the engine further comprises:
a first heat exchanger arrangement having an inlet and an outlet arranged for cooling air to be supplied to said compressor using a heat transfer medium before compression by said compressor;
- a heat transfer medium loop for said heat transfer medium;
- a second heat exchanger arrangement configured for cooling of said heat transfer medium by fuel delivered by said fuel delivery system; wherein in the first mode of operation, air is cooled in the first heat exchanger arrangement by said heat transfer medium.

In operation, for example in an aircraft, air supplied to the engine may be at a relatively high temperature due to deceleration. The first heat transfer arrangement can be used to cool the air using the heat transfer medium. The fuel supplied by the second fuel delivery system may be in cryogenic form, at least in the on-board supply and may be used to cool the heat transfer medium.

Optionally, in the first mode of operation, the heat transfer medium is bypassed around one or more stages of the first heat exchanger arrangement.

Optionally, in the first mode of operation, the temperature of the air to be delivered to the compressor is maintained above the freezing point of water by selectively bypassing the one or more stages of the first heat exchanger arrangement with the heat transfer medium. By controlling the temperature of the air in this way, additional frost control systems are not necessary or their use is minimized. This allows for a simple operation of the engine.

Optionally, fuel from the second fuel supply system is partially combusted with air from said compressor before delivery to said air-breathing combustion chamber.

Optionally, the engine further comprises a turbine for driving said compressor, the turbine being driven using a portion of heat transfer medium supplied from the outlet of the first heat exchanger arrangement.

Optionally, the engine further comprises a third heat exchanger arrangement, wherein in the air-breathing mode of operation, the heat transfer medium is heated in said third heat exchanger arrangement before delivery to said turbine.

Optionally, the engine comprises a first pre-burner in which, at least a portion of the fuel is partially combusted before delivery to said air breathing combustion chamber.

Optionally, exhaust from said pre-burner is supplied to said third heat exchanger arrangement and used for heating of said heat transfer medium.

Optionally, the first pre-burner partially combusts air from said compressor with fuel from said second fuel delivery system. The first pre-burner can therefore be used to control the upper cycle temperature of the heat transfer medium. Optionally, the upper cycle temperature is maintained at a constant level irrespective of engine velocity. The heat generated by the first pre-burner may be exploited to drive the second fuel delivery system and the heat transfer medium loop.

Optionally, the second heat exchanger arrangement comprises one or more regenerator stages and the heat transfer medium is passed through said one or more stages to cool said heat transfer medium.

Optionally, the regenerator stages comprise a series of successive heat exchangers and pumps, the pumps being driven by turbines driven by fuel delivered from the second fuel delivery system.

Optionally, in said second mode of operation, fuel from the first fuel delivery system is partially combusted in a second pre-burner with oxidant from the oxidant delivery system before delivery to the rocket combustion chamber.

Optionally, an exhaust of the second pre-burner drives one or more turbines for driving the first fuel delivery system and/or the oxidant delivery system.

Optionally, the engine further comprises one or more bypass burners in which a portion of fuel delivered from the second fuel delivery system is burnt.

Optionally, the exhausts from the rocket combustion chamber and the air-breathing combustion chamber are fed to a common nozzle.

Optionally, fuel from the second fuel delivery system drives one or more turbines coupled to pumps to drive the heat transfer medium around the heat transfer medium loop.

Optionally, helium is used as the heat transfer medium. Neon or any other suitable heat transfer medium may also be used.

Optionally, hydrogen is delivered by the first and second fuel delivery systems.

Optionally, oxygen is delivered by said oxidant delivery system.

Optionally, the operating pressure of the air-breathing combustion chamber is less than the operating pressure of the rocket combustion chamber. This can reduce the fuel requirements of the air-breathing combustion chamber.

Optionally, the air-breathing combustion chamber operates at a pressure below 20 bar. Optionally, the air-breathing combustion chamber operates at a pressure above 6 bar.

The higher the pressure in the combustion chambers, the more fuel and oxidant may be supplied and thus the more compact the chamber. The more stages in the regenerator, the lower the pressure and fuel requirements in the air-breathing combustion chamber, but a larger combustion chamber may then be needed to provide the necessary thrust.

The rocket combustion chamber may be configured as a conventional rocket combustion chamber and any suitable rocket combustion cycle may be employed.

Optionally, the maximum temperature of the heat transfer medium is maintained substantially constant during the first mode of operation.

Optionally, during transition from the first mode of operation to the second mode of operation, both the air-breathing combustion chamber and the rocket combustion chamber are operated.

According to a third aspect of the present disclosure, there is provided a vehicle comprising an engine according to the first aspect of the disclosure with or without any optional feature thereof or an engine operated according to the method according to the second aspect of the disclosure with or without any optional feature thereof.

According to a fourth aspect of the present disclosure, there is provided an aircraft, flying machine or aerospace vehicle comprising an engine according to the first aspect of the disclosure with or without any optional feature thereof or an engine operated according to the method according to the second aspect of the disclosure with or without any optional feature thereof.

Optionally, the aircraft, flying machine or aerospace vehicle comprises a fuselage with aerodynamic control surfaces adapted to operate together with the engine for a controlled horizontal take-off from zero air-speed with the ending in air breathing mode.

BRIEF DESCRIPTION OF THE DRAWINGS

The present disclosure may be carried out in various ways and embodiments of the disclosure will now be described by way of example with reference to the accompanying drawings, in which:

FIGS. 1A, 1B, and 1C show side, plan and rear elevations respectively of a single stage to orbit (SSTO) aircraft;

DETAILED DESCRIPTION

Figure 2:
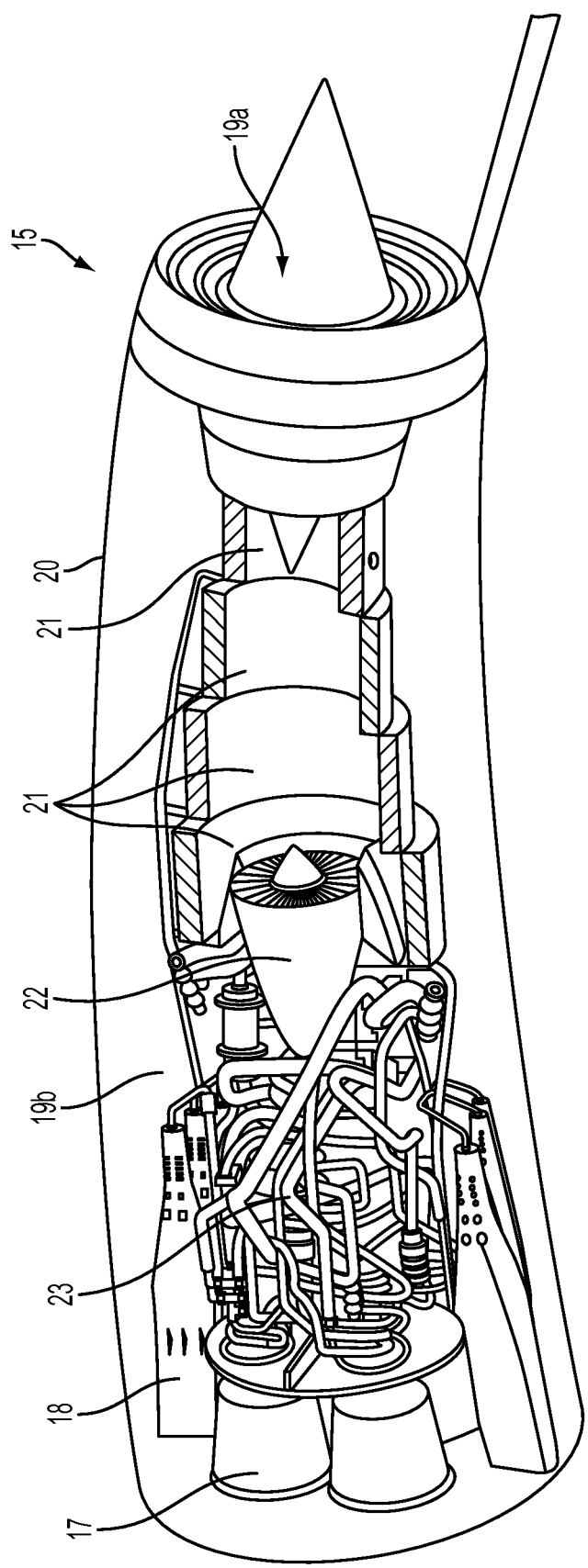
FIG. 2 shows a partial cross-section through a nacelle containing a prior art hybrid air breathing rocket engine module.

FIGS. 1A, 1B and 1C show a single stage to orbit (SSTO) aircraft 1 with a retractable undercarriage 2, 3, 4 having a fuselage 5 with fuel and oxidant stores 6, 7 and a payload region 8. A tail fin arrangement 9 and canard arrangement 10 with respective rudder 11 and canard 12 control surfaces are attached to the fuselage 5. Main wings 13 with elevons 14 are attached to either side of the fuselage 5 and each wing 13 has an engine module 15 attached to a wing tip 16 thereof. As shown in FIGS. 1C and 2, the rear of each engine module 15 is provided with four rocket nozzles 17 surrounded by various bypass burners 18.

FIG. 2 shows a prior art engine module 15. The prior art engine module 15 includes an air inlet 19a, a heat exchanger 21 comprising four parts, a turbo-compressor 22 and cycle flow conduits or channels 23. The engine module 15 is contained within a nacelle 20 which may be attached to an aircraft wing 13, such as an aircraft wing 13 of an aircraft 1 as shown in FIGS. 1A, 1B, 10.

In an air breathing mode of operation of the engine module 15 within the Earth's atmosphere, part of the incoming air passing through the air inlet 19a passes through the heat exchanger 21 to the turbo-compressor 22 and another part is bypassed along bypass duct 19b to the bypass burners 18.

In a preferred embodiment, the prior art engine module is replaced with an engine module arranged and controlled as described below.

Figure 3:
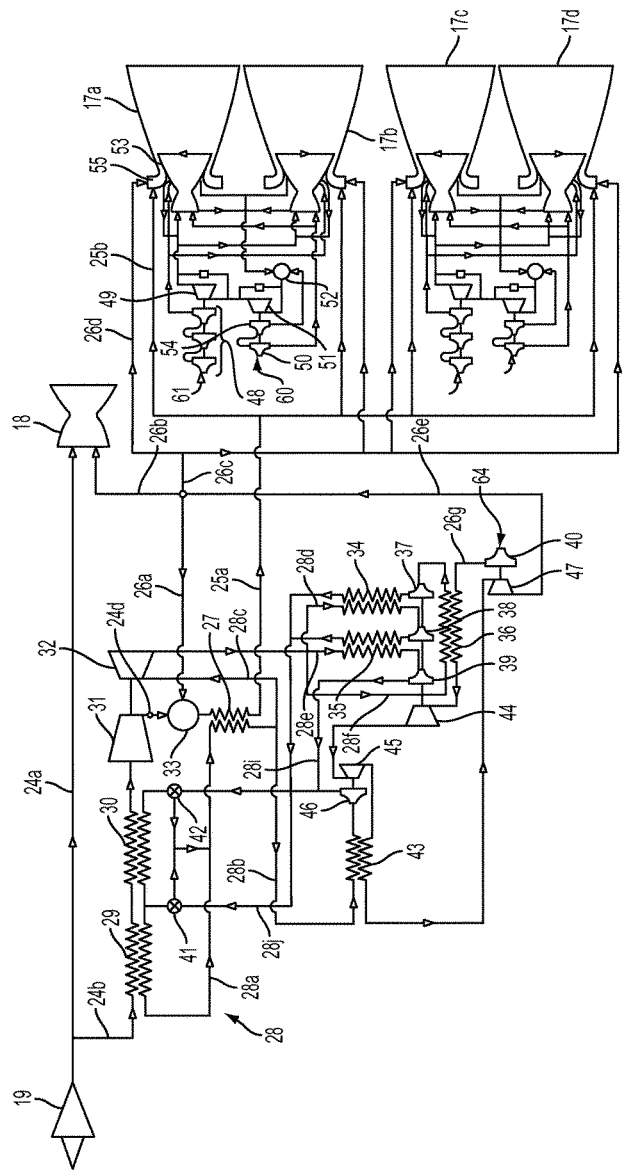
FIG. 3 shows a schematic cycle diagram of a hybrid air breathing rocket engine.

A schematic of an engine module or propulsion system is shown in FIG. 3. The engine module comprises an air intake 19. The air intake 19 may be axisymmetric such that when the aircraft is travelling at supersonic velocities, the air-intake 19 serves to decelerate the captured airflow to subsonic via oblique and normal shock waves. At high Mach numbers, e.g. around Mach 5 and above, this deceleration can cause the air inlet temperature typically to increase to over 1250K.

The air passing through the air intake splits into two flow paths. One of these flow paths 24a supplies air to a bypass burner 18 comprising a nozzle. More hydrogen than needed is supplied to the cycle and the bypass burners can be used in combination with the main combustion chambers to improve fuel utilization and engine performance. Another portion of the air from the air intake 19 passes via flow path 24b to a first heat exchanger arrangement configured as a pre-cooler, which is needed to cool the compressed inlet air. In the embodiment, the pre-cooler comprises a first heat exchanger stage 29 and a second heat exchanger stage 30 although a pre-cooler with any number of heat exchanger stages is envisaged. The first stage 29 of the heat exchanger and the second stage of the exchanger 30 correspond to higher and relatively lower temperature portions respectively.

Following the passage of the air through the heat exchanger stages 29, 30, the air passes through compressor 31 which is driven by turbine 32 as described in further detail below. The compressor is chosen to provide a predetermined compression ratio dependent on the performance requirements of the engine. In the embodiment, the compressor may typically have a compression ratio of around 13:1 such that the intake air is compressed to around 16 bar. The compressor may comprise two spools and may comprise titanium blades.

Typically, such an engine will be provided with a plurality of combustion chambers and associated rocket nozzles. In the schematic, four nozzles 17a, 17b, 17c, 17c are shown. Sharing each nozzle are two combustion chamber types. One combustion chamber type is used in an air-breathing mode of operation for the combustion of fuel, such as hydrogen with pressurized air which has come from the compressor 31. The air may be used to partially combust a portion of the hydrogen in a pre-burner 33, before being delivered to the air-breathing combustion chambers. The other combustion chamber type is used in full rocket mode, i.e. when on-board oxidant, such as liquid oxygen, is utilized instead of the compressed air.

Although only one nozzle and associated combustion chambers of the above described types will be highlighted when describing the operation of this engine, it should be understood that any other rocket chambers/nozzles provided may operate in a similar or identical manner and that each will receive a proportion of the fuel and oxidant in order to operate and provide thrust to the vehicle.

A typical aircraft or vehicle may include four combustion chamber/nozzle assemblies arranged in a nacelle. However, any number of chamber/nozzle assemblies may be provided in order to provide the required thrust to the vehicle.

In an aircraft with two nacelles, each comprising four nozzle assemblies, the nozzle assemblies can be configured to behave as a single engine during air breathing ascent and as two twin chamber rocket engines during rocket ascent. This can serve to increase mission reliability and minimize the volume of the engine installation.

Compressed air from the outlet of the compressor 31 is fed to a pre-burner 33 via flow path 24d. The pre-burner 33 may also be supplied with fuel, in the embodiment in the form of hydrogen, via flow path 26a. The hydrogen may be stored on-board the aircraft, typically in cryogenic form and delivered, in the embodiment by pump or compressor 40 from store 64.

Downstream of the pre-burner 33, a heat exchanger 27 is provided to transfer heat from the pre-burner combustion products to a closed loop helium cooling circuit 28.

The helium cooling circuit 28 may, in some modes of operation, pass through the first and second stages 29, 30 of the pre-cooler. The pre-cooler operates as a counter-flow heat exchanger. In such a mode, following the first stage 29 of the pre-cooler, i.e. the stage downstream in the helium loop of the second stage, the helium stream passes along path 28a to the pre-burner combustion heat exchanger 27.

Following the pre-burner combustion heat exchanger 27, the helium loop splits into first and second helium streams 28b and 28c. The second helium stream 28c passes through turbine 32, in the embodiment with an inlet pressure of around 200 bar and outlet pressure of around 60 bar. The turbine 32 is used to drive the compressor 31. The turbine 32 may be a counter-rotating turbine.

Following its exit from the turbine 32, the helium stream, in the embodiment at around 600 degrees Kelvin (600K), passes to a heat exchanger and recompression stage, which in the embodiment, comprises three helium regenerator heat exchangers, 34, 35, 36 and recirculators, e.g. compressors or pumps 37, 38, 39.

The regenerator heat exchangers 34, 35, 36 may comprise thousands of diffusion bonded thin titanium sheets with micro-channels formed into their surface. The compressors or recirculators 27, 38, 39 may comprise centrifugal turbomachinery.

The helium stream from the turbine 32 splits into first, second and third recompression helium streams 28d, 28e, 28f.

The first recompression helium stream 28d, in the embodiment at around 600K passes through the first regenerator heat exchanger 34 where it is cooled to around 100K. The helium is then recompressed in compressor 38, in the embodiment from around 60 to around 200 bar, before then passing through second regenerator heat exchanger 35, which serves to cool the second recompression helium stream 28e from the turbine 32, in the embodiment from around 600K to around 200K. The first recompression helium stream then joins helium stream 28j.

After the second regenerator heat exchanger 35, the second recompression helium stream 28e is recompressed in third compressor 39, in the embodiment from around 60 bar to 200 bar, before passing to helium stream 28i. The helium stream 28i then joins the helium stream from the pre-burner heat exchanger 27, before joining first diverter valve 41, which here can be used to divert the helium stream from the second stage 30 of the pre-cooler.

The third recompression helium stream 28f passes to third regenerator heat exchanger 36, where it is cooled by hydrogen stream 26g, in the embodiment from around 600 to 50K. The hydrogen stream is provided with a fuel delivery arrangement, here in the form of liquid hydrogen pump 40, which delivers hydrogen from an onboard hydrogen store 64.

After the heat exchanger 36, the third recompression helium stream passes through first compressor 37, where in the embodiment, the helium is compressed from around 60 to around 200 bar. The helium stream then passes through heat exchanger 34, serving to cool the first recompression helium stream 28d as described above, before then joining helium stream 28j with the first recompression helium stream 28d which has passed through heat exchanger 35.

Helium stream 28j passes to first diverter valve 41, which can be used to supply additional cooled helium to a predetermined stage of the pre-cooler, here before the first stage 29 of the pre-cooler.

The helium stream from the pre-burner heat exchanger 27 is cooled, in the embodiment from around 900 to around 300K in heat exchanger 43, by hydrogen which has passed through the third regenerator heat exchanger 36. Before reaching the heat exchanger 43, the hydrogen passes through turbine 44, which is used to drive the first, second and third compressors 36, 37, 38 of the recompression stage. The hydrogen also passes through turbine 45 to drive helium pump 46 to pump helium to the second diverter valve 42.

Following heat exchanger 43, the hydrogen passes through turbine 47, which drives the hydrogen pump 40, which serves to pump hydrogen from the on-board hydrogen store 64.

Following turbine 47, hydrogen passes to bypass burner 18 as well as pre-burner 33 and then during air-breathing operation, to the air-breathing combustion chambers of the rocket nozzles 17a, 17b, 17c.

In the embodiment, the combustion chambers may be lined using liners comprising, for example, an alumina dispersion hardened copper such as GLIDCOP AL-20 or other suitable thermally conduct material. Such thermally conductive material may be employed in view of the high wall temperature that can be reached in the combustion chambers during the air breathing operating mode. This avoids thermal stress in the wall. In this mode of operation, the combustion chamber may be film-cooled using hydrogen through film cooling in the combustion chambers.

In the embodiment, the nozzles 17a, 17b, 17c, 17d comprise a tubular cooled skirt with a final radiation cooled extension, for example of SEP-CARBINOX. This seeks to enable the nozzles to survive external air flow heating during re-entry into the atmosphere, when no coolant is available for engine cooling. In the embodiment, the cooled tubular skirt is made from high temperature alloys, such as Inconel, which may comprise a plurality of tubes.

In the embodiment, during air breathing mode, liquid hydrogen may be configured to cool the nozzle skirt by passing hydrogen through the tubes in the skirt. In rocket mode, hydrogen may pass through the liner of the separate rocket combustion chambers 53 and the tubular skirt before entering an injector (not shown) of the rocket combustion chamber.

The pre-cooler 29, 30 is used to cool the inlet air in air-breathing mode. In the embodiment, the pre-cooler 29, 30 is a high performance heat exchanger which uses high pressure gaseous helium in a closed loop as a cooling medium. The helium loop in air-breathing mode is described in further detail below.

A suitable pre-cooler heat exchanger may be configured as a counter flow heat exchanger with a matrix of cooling channels or tubes of less than 1 mm in diameter with thin walls of typically 20-30 micrometers. A large number e.g. 300,000 to 600,000 of such tubes are nested and arranged in involute spirals in each heat exchanger in order to provide the necessary performance. The tubes may follow a spiral path from the inlet to the outlet with the tubes extending either radially or axially. In the embodiment, the pre-cooler is configured to enable cooling of the inlet air from temperatures of 1250K to a temperature of about 400K or less depending on the mode of operation. In the embodiment, at all velocities, the temperature of the air is maintained above the freezing point of water, i.e. 0 degrees Centigrade.

As outlined above, hydrogen is supplied from store 64 by pump 40 where it is used to cool the helium circuit via heat exchangers 36 and 43. Boost pumps (not shown) may be provided to prevent cavitation of the fuel pump 40 and minimize residual fluid trapped in feed lines.

Following hydrogen turbine 47, hydrogen is fed to the pre-burner 33 along flow path 26a. Hydrogen may also be fed to the by-pass burners 18 via flow paths 26b, 26e. Additionally, in air-breathing mode, hydrogen may be supplied to the rocket combustion chambers along flow paths 26c and 26d, where it is combusted with the pre-burner combustion products delivered along flow paths 25a and 25b. In air-breathing mode, the air-breathing combustion chambers operate at around 12 bar. This air-breathing combustion chamber is separate to the rocket combustion chambers used in full rocket mode, which operate at a relatively much higher pressure of around 170 bar.

For rocket mode, each rocket nozzle and combustion chamber arrangement is supplied with hydrogen using a fuel delivery system, which in the embodiment comprises an on-board hydrogen store 61 and a series of pumps 48 achieving a pressure of around 315 bar. In the embodiment, the hydrogen is initially delivered to provide cooling of the rocket combustion chambers 53.

After being used to cool the combustion chambers 53, hydrogen is supplied to a combustion chamber pre-burner 52, where it is partially combusted with oxygen supplied by an oxidant delivery system, in the embodiment comprising liquid oxygen pump 50 and topping up pump 54.

The combustion products of the rocket pre-burner 52 serve to drive turbines 49, 51 which drive the oxygen and hydrogen pumps 48, 50, 54.

The combustion products of the pre-burner 52 are then fully combusted in the combustion chamber 53 with additional oxygen supplied by oxygen pump 50.

In the air-breathing mode of operation of the engine, liquid oxygen is not needed as an oxidant for the rocket chamber. Air-breathing enables an aircraft which comprises such an engine to take off without needing to use a separate source of oxygen and without an additional propulsion means, which has significant weight advantages as there is a reduced requirement to carry an additional oxidant on the aircraft.

The pre-burner 33 exhaust is used to pre-heat the helium via heat exchanger 27, in the embodiment to around 930K and pressure of 200 bar, before the helium passes to turbine 32 to drive the air intake compressor 31. The pre-burner 33 is controlled, e.g. the amount of hydrogen combusted is controlled, to maintain a constant upper cycle temperature of helium, in the embodiment typically around 930K, which is independent of the Mach number of the aircraft while in air-breathing mode.

The pre-burner 33 burns hydrogen from the on-board store 64 with compressed air fed along flow path 24d. The pre-burner outlet gases flow along path 25a before being fed into the air breathing combustion chamber 55.

Although the pre-burner 33 may be chosen depending on the performance requirements of the engine, in the embodiment, the pre-burner 33 and heat exchanger 27 form an integral unit comprised of a hydrogen rich combustor and shell-and-tube heat exchanger with a single floating tube sheet.

Figure 4:
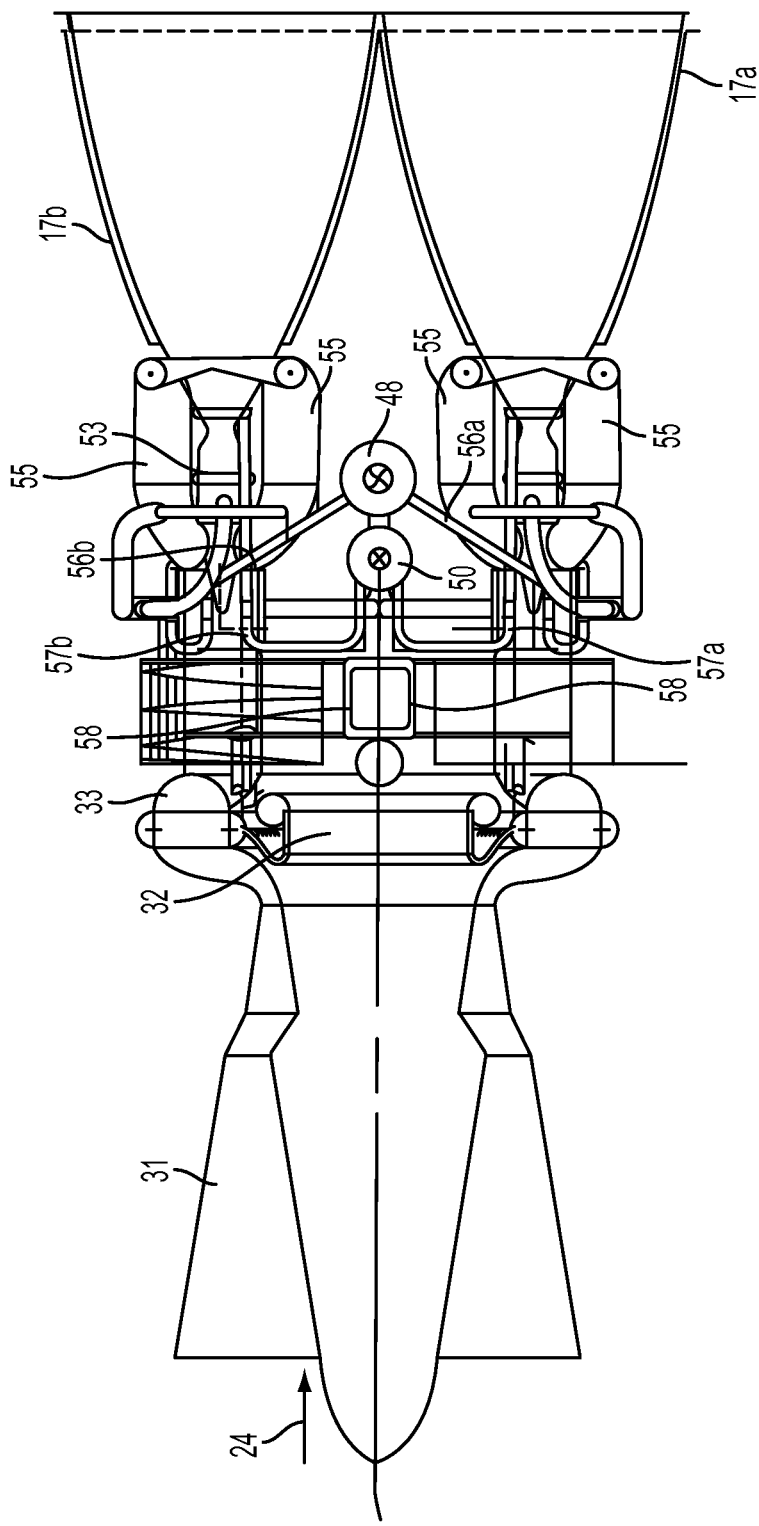
FIG. 4 shows a schematic of an example hybrid air breathing rocket engine which can operate on the cycle shown in FIG. 4.

FIG. 4 shows a schematic cross-section through a rocket engine, which may be configured to operate with the cycle shown in FIG. 3. Air 24, which has already passed through the pre-cooler (not shown) as described above, is fed into the compressor 31, which is driven by helium turbine 32 before passing to pre-burner 33.

The combustion products of the pre-burner 33 are then fed to the air-breathing combustion chambers 55, which are provided as axially extending chambers. Three such chambers may be provided equiangularly spaced around each rocket combustion chamber 53. The rocket combustion chambers 53 may be formed as axially extending chambers. Hydrogen is fed to the rocket combustion chambers 53 via pump 48 along conduits 56a, 56b.

The exhaust of the combustion chambers 55 is fed to the respective rocket nozzle 17a, 17b.

In full rocket mode, hydrogen is fed to the rocket combustion chambers 53, which are separate to the air-breathing combustion chambers 55. Oxygen is delivered in full rocket mode, via pump 50 along conduits 57a, 57b. The rocket combustion chambers 53 operate typically at around 170 bar and in combination with the nozzles 17a, 17b produce around 500 kN gross thrust.

It can therefore be seen that while different combustion chamber types are used for air-breathing and full rocket modes of operation, in each mode, the combustion chambers share a common nozzle.

The engine is connected to the wings of an aircraft, such as that shown in FIG. 1A, via thrust bar 58.

Figure 5:
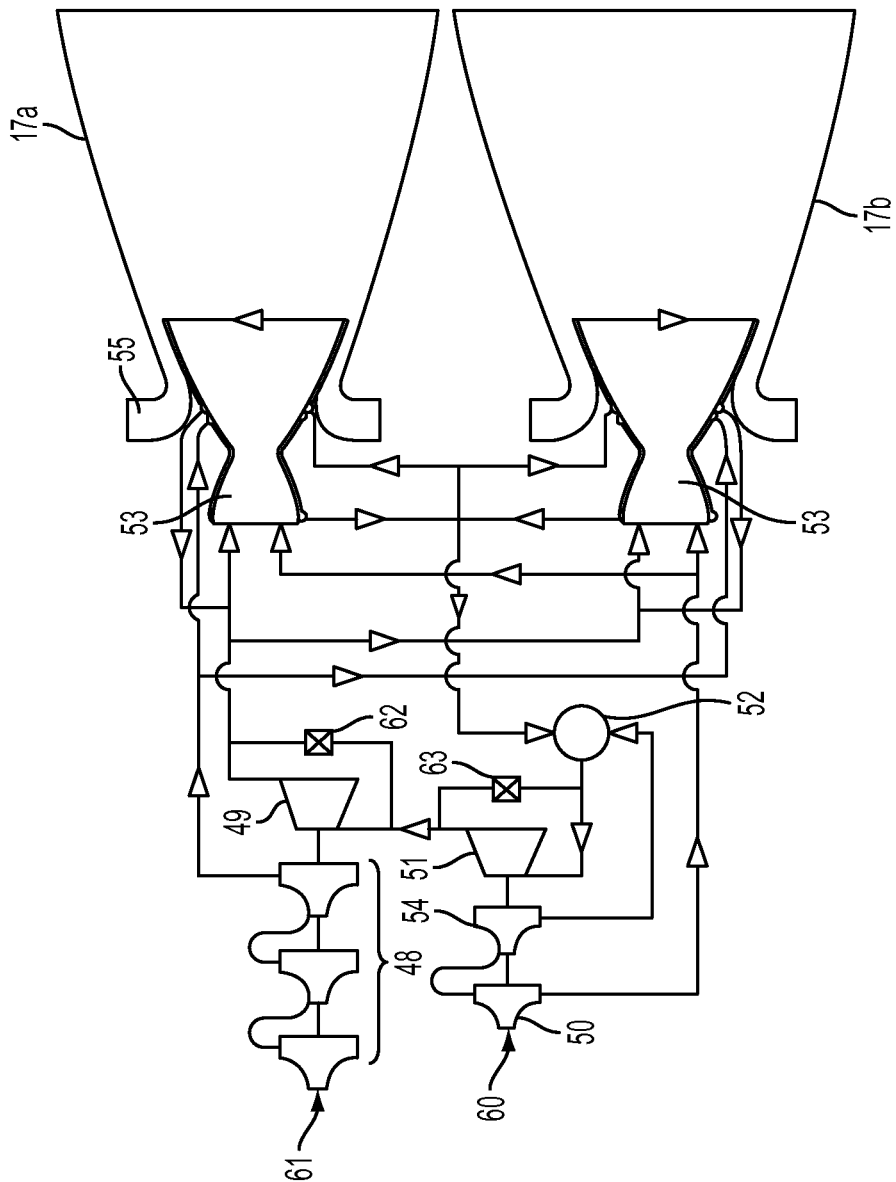
FIG. 5 shows a schematic cycle diagram of the hybrid air breathing rocket engine of FIGS. 3 and 4 operating in full rocket mode, e.g. typically at a velocity above Mach 5.

FIG. 5 shows a schematic cycle diagram of the engine in full rocket mode. In this mode of operation, the helium cooling circuit is redundant and is thus not shown, as the rocket combustion chamber 53 operates with liquid oxygen from on-board supply 60. The air-breathing combustion chamber 55 is not used in this mode of operation.

As has been described above, in this mode of operation, hydrogen, in cryogenic form, is supplied from the on-board supply 61 via pumps 48. The hydrogen is first used to cool the combustion chambers 53, before being fed to the pre-burner 52, where is it partially combusted with oxygen supplied by topping up pump 54. The pre-burner 52 operates hydrogen rich.

The combustion products of the pre-burner, which in the embodiment are around 1000 K and at a pressure of 250 bar are used to drive turbines 51, 49 which drive the hydrogen pumps 48 and the liquid oxygen pumps 54, 50. Bypass valves 62, 63 are provided to bypass the turbines and regulate the flow rate of gases provided to the turbines 49, 51 to drive the pumps 48, 54, 50. The bypass valves 62, 63 can provide engine throttling.

The pre-burner combustion products are then fed to the rocket combustion chambers 53 with oxygen supplied from pump 50. The rocket combustion chamber operates at temperatures in the region of 3500K and a pressure of around 170 bar. This gives a vacuum thrust of around 500 kN.

Boost pumps (not shown) may be provided to prevent cavitation of the hydrogen and oxygen pumps 61, 60 and minimize residuals trapped in feed lines.

Figure 6:
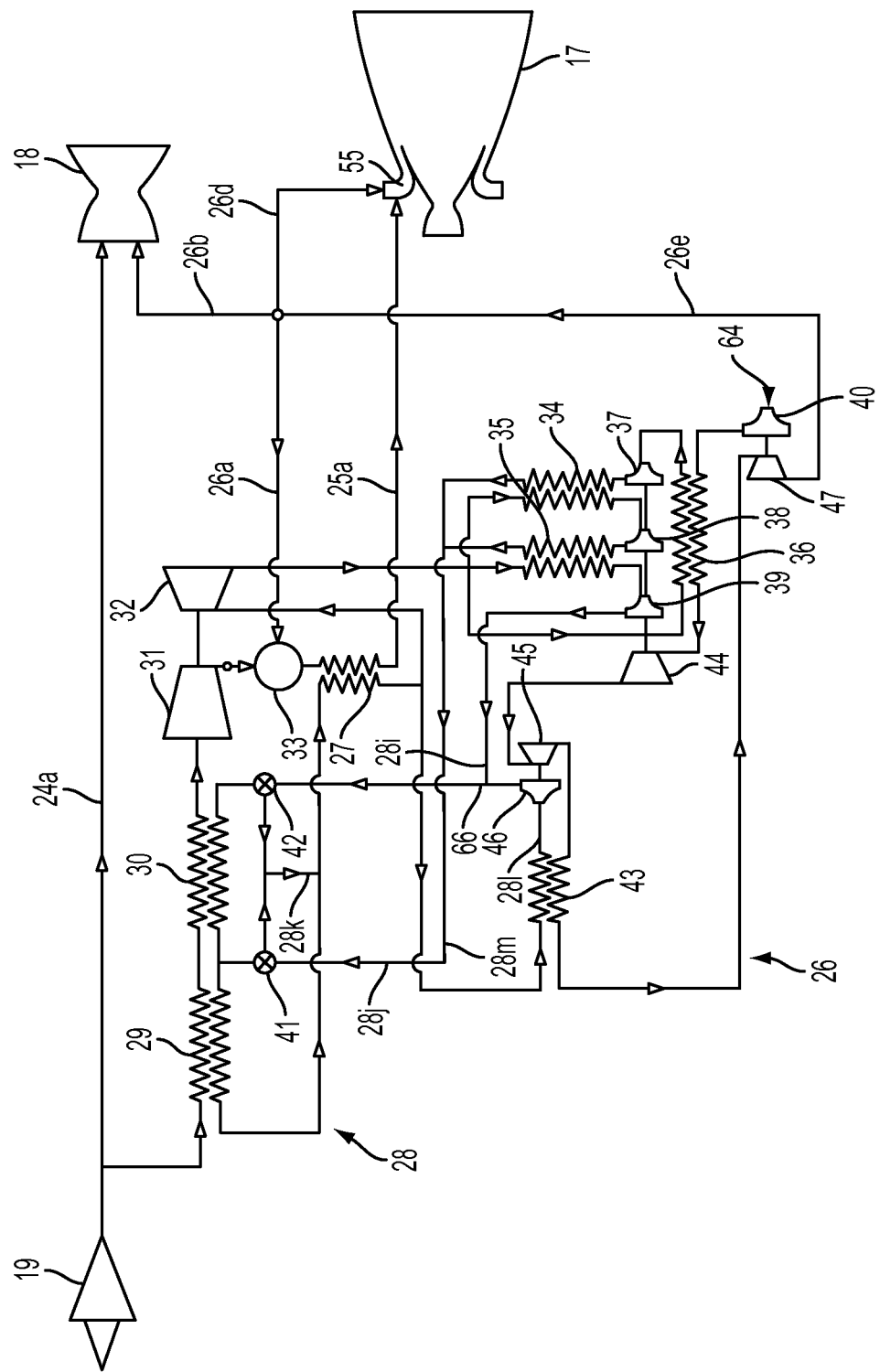
FIG. 6 shows a schematic cycle diagram of a hybrid air breathing rocket engine in an air breathing mode at a low Mach number, e.g. at a velocity typically below Mach 5

FIG. 6 shows a schematic cycle diagram of the engine in air-breathing mode, typically up to velocities under March 5. In this mode, the full rocket mode system is redundant and is not shown. As described above in relation to FIG. 3, the air-breathing combustion chamber 55 is used to combust hydrogen delivered from on-board store 64 via pump 40 as well as the products of the pre-burner 33 where a portion of the hydrogen from on-board store 64 is combusted with compressed air delivered from compressor 31. The air-breathing combustion chambers operate at a much lower pressure than the rocket combustion chambers. Typically, the air-breathing combustion chambers 55 operate below 20 bar.

The cooling of the helium stream from turbine 32 by the hydrogen loop 26 using the helium regenerator heat exchangers 34, 35, 36 and compressors 37, 38, 39 as well as heat exchanger 43 has been described above in relation to FIG. 3. The cooled helium may be used in the air-breathing mode to cool the intake air delivered from intake 19 in the pre-cooler heat exchanger stages 29, 30.

The helium loop 28 is provided with two diverter valves 41, 42 which can be configured to divert the helium such that it bypasses one or more stages of the pre-cooler. Although, in the embodiment, helium is used as a heat transfer fluid, any other suitable fluid may be used, such as neon.

As discussed above, in the embodiment, the pre-cooler comprises a first stage 29 and a second stage 30. The pre-cooler heat exchanger may comprise any number of stages depending on the cooling requirements.

As described above, due to the deceleration of the inlet air, the inlet air temperature before the pre-cooler can increase to around 1250K or more. In the embodiment, helium is delivered to the bypass valves 41, 42 at around 200 bar typically at a temperature of around 350K. The bypass valves are configured to supply cooled helium to the pre-cooler in order to decrease the inlet air-temperature which has increased to around 1250K at some aircraft velocities. In the embodiment, the air may be cooled in the range 288K to 380K, but to avoid frost formation on the pre-cooler, the air temperature is kept above the freezing point of water, i.e. above 273K at standard pressure.

Depending on the aircraft velocity, the cooling requirements of the pre-cooler vary and the bypass valves 41, 42 are activated as appropriate to achieve the desired air temperature prior to the compressor 31.

At subsonic velocities, air intake 19 bypasses air flow past the pre-cooler to the compressor 31. In the embodiment, below a velocity of around Mach 1.9, the first and second bypass valves 41, 42 are configured to bypass both first and second stages 29, 30 of the pre-cooler. The helium therefore passes from streams 28$j$ and 28$i$ to bypass stream 28$k$ to deliver helium to the pre-burner heat exchanger 27. Following the heat exchanger 27, the helium stream divides between turbine 32 and hydrogen heat exchanger 43.

In the embodiment, between a velocity of around Mach 1.9 and 2.9, the first bypass valve 41, connected to helium stream 28$j$, bypasses helium around the first stage 29 of the pre-cooler. The second bypass valve 42 is configured to deliver cooled helium to from stream 28$i$ to the second stage 30 of the pre-cooler. After passing through the second stage 30 of the pre-cooler, the helium flows through the first stage 29 of the pre-cooler. The helium then joins bypass stream 28$k$ before then flowing to the pre-burner heat exchanger 27.

In the embodiment, above a velocity of Mach 2.9 and before full rocket mode above around Mach 5, the bypass valves 41, 42 are configured such that cooled helium from streams 28$i$ and 28$l$ passes to the first stage 29 of the pre-cooler and cooled helium in stream 28$m$ from the recompression heat exchangers 34, 35, 36 is delivered to the inlet of the second stage 29 of the pre-cooler.

In the air-breathing mode of operation, at Mach 5, using air-breathing combustion chambers 55 and associated nozzles 17, the engine may produce around 295 kN gross thrust at an altitude of 26 km.

The helium stream 28$i$ from the recompression stages and the helium stream 28$l$ from the hydrogen heat exchanger 43 meet at flow junction 66. In the embodiment, the enthalpy or temperature of the two flows 28$i$ and 28$l$ is designed to be mismatched. This seeks to allow the cycle to be tuned to match all the component characteristics.

The helium loop 28 is a closed cycle loop, which as descried above, transfers heat to the to the cryogenic hydrogen fuel flow. The hydrogen therefore acts as a heat sink. The pre-burner 33 and pre-burner heat exchanger 27 are used to maintain a constant helium upper cycle temperature independent of the vehicle velocity.

The air-breathing pre-burner 33 operates air-rich. In air-breathing mode, in the embodiment, the air-breathing combustion chambers 55 operate at relatively low pressures of around 12 bar. The equivalence ratio, i.e. the actual fuel-to-air ratio to the stoichiometric fuel-to-air ratio, of the engine in air-breathing mode, in the embodiment, is around 1.2. In this way, the consumption of hydrogen in air-breathing mode is optimized. This can allow for an increased payload as less hydrogen fuel is needed in air-breathing mode, than in a system where the air is compressed to much higher pressures.

The engine is configured to operate using air for take-off. The engine may be started by an auxiliary turbo pump (not shown) driven from the vehicle's internal gaseous propellant supply system serving to supply hydrogen and oxygen from the on-board stores.

During transition from air-breathing to rocket modes, the rocket engine must be throttled up whilst the air-breathing engine is throttled down to control the overall vehicle thrust level.

The air-breathing and full rocket mode components are separate, albeit using a common nozzle. While the engine includes two types of combustion chamber and therefore greater mass and complexity than if only one were used, the hydrogen fuel efficiency outweighs this mass increase.

Although a preferred rocket engine cycle has been described, other suitable cycles may be employed to deliver high combustion pressures in the combustion chambers.

Various modifications may be made to the described embodiment(s) without departing from the scope of the invention as defined by the accompanying claims.

The invention claimed is:
1. An engine comprising:
   a rocket combustion chamber for the combustion of fuel and oxidant;
   an air-breathing combustion chamber for the combustion of fuel and oxidant;
   a compressor for pressurizing air for supply to the air-breathing combustion chamber;
   a first fuel delivery system for delivering fuel to the rocket combustion chamber;

a second fuel delivery system for delivering fuel to the air-breathing combustion chamber;

an oxidant delivery system for delivering oxidant to the rocket combustion chamber;

wherein the air-breathing combustion chamber and the rocket combustion chamber are configured to be operated independently with the engine being switchable from an air-breathing mode to a full rocket mode; and wherein the engine further comprises:

a first heat exchanger arrangement having an inlet and an outlet arranged for cooling air to be supplied to the compressor using a heat transfer medium before compression by the compressor;

a heat transfer medium loop for the heat transfer medium; and a second heat exchanger arrangement configured for cooling of the heat transfer medium by fuel delivered by the first or second fuel delivery system.

2. An engine according to claim 1, wherein the engine further comprises a turbine for driving the compressor, the turbine being configured to be driven using a portion of heat transfer medium from the outlet of the first heat exchanger arrangement.

3. An engine according to claim 2, wherein the engine further comprises a third heat exchanger arrangement configured for heating the heat transfer medium before delivery to the turbine.

4. An engine according to claim 3, wherein the engine further comprises a first pre-burner configured to partially combust at least a portion of the fuel before delivery to the air-breathing combustion chamber.

5. An engine according to claim 4, wherein an exhaust from the first pre-burner is connected to the third heat exchanger arrangement for heating of the heat transfer medium.

6. An engine according to claim 4, wherein the first pre-burner is configured to partially combust air from the compressor with fuel from the second fuel delivery system.

7. An engine according to claim 1, wherein the second heat exchanger arrangement comprises one or more regenerator stages.

8. An engine according to claim 7, wherein the one or more regenerator stages comprises a series of successive heat exchangers and pumps.

9. An engine according to claim 1, wherein the engine comprises one or more bypass valves in the heat transfer medium loop for bypassing the heat transfer medium around one or more stages of the first heat exchanger arrangement.

10. An engine according to claim 4, further comprising a second pre-burner for partially combusting fuel before delivery to the rocket combustion chamber with oxidant supplied by the oxidant delivery system.

11. An engine according to claim 10, wherein an exhaust of the second pre-burner is used to drive one or more turbines for driving the first fuel delivery system and/or the oxidant delivery system.

12. An engine according to claim 1, wherein the engine further comprises one or more bypass burners for burning a portion of fuel delivered from the second fuel delivery system.

13. An engine according to claim 1, wherein a plurality of the air-breathing combustion chambers are provided and arranged around the rocket combustion chamber.

14. An engine according to claim 1, wherein the rocket combustion chamber and the air-breathing combustion chamber share a common nozzle.

15. An engine according to claim 1, wherein fuel from the second fuel delivery system is used to drive one or more turbines coupled to pumps for driving the heat transfer medium around the heat transfer medium loop.

16. An engine according to claim 1, wherein the heat transfer medium loop is configured as a closed flow loop.

17. An engine according to claim 1, wherein the engine comprises helium as the heat transfer medium.

18. An engine according to claim 1, wherein the first and second fuel delivery systems are configured to supply hydrogen as the fuel.

19. An engine according to claim 1, wherein the air-breathing combustion chamber is configured to combust compressed air from the compressor with fuel.

20. An engine according to claim 6, wherein the air-breathing combustion chamber is configured to combust compressed air from the compressor with fuel and the engine is configured for the partial combustion of fuel with the compressed air before delivery to the air-breathing combustion chamber.

21. An engine according to claim 1, wherein the engine is adapted for ignition into the air-breathing mode in which it is adapted to produce thrust in continuous operation at zero air-speed.

22. A method of operating an engine, the engine comprising:

a rocket combustion chamber for the combustion of fuel and oxidant;

an air-breathing combustion chamber for the combustion of fuel and oxidant;

a compressor for pressurizing air for supply to the air-breathing combustion chamber;

a first fuel delivery system for delivering fuel to the rocket combustion chamber;

a second fuel delivery system for delivering fuel to the air-breathing combustion chamber;

an oxidant delivery system for delivering oxidant to the rocket combustion chamber;

wherein the air-breathing combustion chamber and the rocket combustion chamber are configured to be operated independently with the engine being switchable from an air-breathing mode to a full rocket mode;

the engine further comprising:

a first heat exchanger arrangement having an inlet and an outlet arranged for cooling air to be supplied to the compressor using a heat transfer medium before compression by the compressor;

a heat transfer medium loop for the heat transfer medium; and a second heat exchanger arrangement configured for cooling of the heat transfer medium by fuel delivered by the first or second fuel delivery system, the method comprising:

in a first mode of operation, supplying the air-breathing combustion chamber with fuel and oxidant to operate the engine in the air-breathing mode; and in a second mode of operation, supplying the rocket combustion chamber with fuel and oxidant to operate the engine in the full rocket mode;

wherein, in the first mode of operation, air is cooled in the first heat exchanger arrangement by the heat transfer medium.

23. A method of operating an engine according to claim 22, wherein in the first mode of operation, the heat transfer medium is bypassed around one or more stages of the first heat exchanger arrangement.

24. A method of operating an engine according to claim 23, wherein in the first mode of operation, a temperature of the air to be delivered to the compressor is maintained above the freezing point of water by selectively bypassing the one or more stages of the first heat exchanger arrangement with the heat transfer medium.

25. A method of operating an engine according to claim 22, wherein fuel from the second fuel delivery system is partially combusted with air from the compressor before delivery to the air-breathing combustion chamber.

26. A method of operating an engine according to claim 25, wherein the method further comprises using a turbine for driving the compressor, the turbine being driven using a portion of heat transfer medium supplied from the outlet of the first heat exchanger arrangement.

27. A method of operating an engine according to claim 26, wherein the method further comprises using a third heat exchanger arrangement, wherein in the air-breathing mode, the heat transfer medium is heated in the third heat exchanger arrangement before delivery to the turbine.

28. A method of operating an engine according to claim 27, wherein the method comprises using a first pre-burner in which at least a portion of the fuel is partially combusted before delivery to the air-breathing combustion chamber.

29. A method of operating an engine according to claim 28, wherein exhaust from the first pre-burner is supplied to the third heat exchanger arrangement and used for heating of the heat transfer medium.

30. A method of operating an engine according to claim 28, wherein the first pre-burner partially combusts air from the compressor with fuel from the second fuel delivery system.

31. A method of operating an engine according to claim 22, wherein the second heat exchanger arrangement comprises one or more regenerator stages and the heat transfer medium is passed through the one or more regenerator stages to cool the heat transfer medium.

32. A method of operating an engine according to claim 31, wherein the one or more regenerator stages comprises a series of successive heat exchangers and pumps, the pumps being driven by turbines driven by fuel delivered from the second fuel delivery system.

33. A method of operating an engine according to claim 28, wherein in the second mode of operation, fuel from the first fuel delivery system is partially combusted in a second pre-burner with oxidant from the oxidant delivery system before delivery to the rocket combustion chamber.

34. A method of operating an engine according to claim 33, wherein an exhaust of the second pre-burner drives one or more turbines for driving the first fuel delivery system and/or the oxidant delivery system.

35. A method of operating an engine according to claim 22, wherein the method comprises using one or more bypass burners in which a portion of fuel delivered from the second fuel delivery system is burned.

36. A method of operating an engine according to claim 22, wherein the exhaust from the rocket combustion chamber and the exhaust from the air-breathing combustion chamber are fed to a common nozzle.

37. A method of operating an engine according to claim 22, wherein fuel from the second fuel delivery system drives one or more turbines coupled to pumps to drive the heat transfer medium around the heat transfer medium loop.

38. A method of operating an engine according to claim 22, wherein helium is used as the heat transfer medium.

39. A method of operating an engine according to claim 22, wherein hydrogen is delivered by the first and second fuel delivery systems.

40. A method of operating an engine according to claim 22, wherein oxygen is delivered by the oxidant delivery system.

41. A method of operating an engine according to claim 22, wherein the operating pressure of the air-breathing combustion chamber is less than the operating pressure of the rocket combustion chamber.

42. A method of operating an engine according to claim 41, wherein the air-breathing combustion chamber operates at a pressure of below 20 bar.

43. A method of operating an engine according to claim 22, wherein a maximum temperature of the heat transfer medium is maintained substantially constant during the first mode of operation.

44. A method of operating an engine according to claim 22, wherein during transition from the first mode of operation to the second mode of operation, both the air-breathing combustion chamber and the rocket combustion chamber are operated.

45. An aircraft, flying machine or aerospace vehicle comprising an engine according to claim 1.

46. A method of operating an engine according to claim 22, wherein the engine is configured in an aircraft, flying machine, or aerospace vehicle.

47. An aircraft, flying machine or aerospace vehicle according to claim 45, further comprising a fuselage with aerodynamic control surfaces adapted to operate together with the engine for a controlled horizontal take-off from zero air-speed with the ending in the air-breathing mode.

* * * * *